(No Model.)
T. H. HICKS.
SYSTEM OF ELECTRICAL DISTRIBUTION AND CONVERSION.
No. 399,534. Patented Mar. 12, 1889.
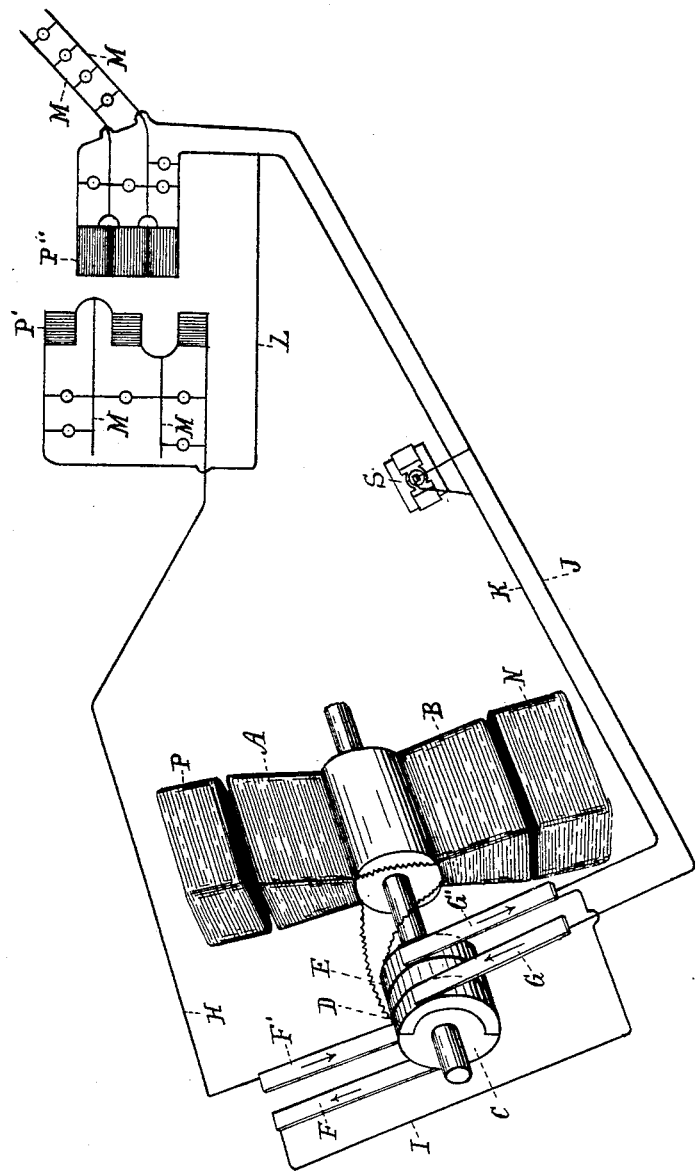
Attest:
John Schuman.
P. M. Hulbert
Inventor:
Thomas H. Hicks.
By Thos. D. Sprague & Son
Att'y

UNITED STATES PATENT OFFICE.

THOMAS H. HICKS, OF DETROIT, MICHIGAN, ASSIGNOR TO THE HICKS INDUCTION-LIGHT AND MOTOR COMPANY, OF MICHIGAN.

SYSTEM OF ELECTRICAL DISTRIBUTION AND CONVERSION.

SPECIFICATION forming part of Letters Patent No. 399,534, dated March 12, 1889.

Application filed April 26, 1888. Serial No. 271,937. (No model.)

*To all whom it may concern:*

Be it known that I, THOMAS H. HICKS, a citizen of the United States, residing at Detroit, in the county of Wayne and State of Michigan, have invented certain new and useful Improvements in System of Electrical Distribution and Conversion, of which the following is a specification, reference being had therein to the accompanying drawing.

This invention relates to new and useful improvements in system of electrical distribution and conversion, and the object of the invention is to carry on incandescent lighting by generating and distributing the electrical energy in the form of a current of high potential.

To this end my invention consists, first, in the peculiar manner of producing pulsating currents by separately collecting all the like electrical impulses of a generator organized for the production of alternate currents of high potential and distributing the current thus divided into two pulsating currents over distinct main conductors, and arranging in operative relation to each of said conductors a generator excited by the supply-current for feeding the translating devices during the interruption of the supply-current, whereby the breaking of the current and consequent loss of energy, as in the ordinary production of pulsating currents, is avoided.

My invention further consists in the combination of such pulsating currents with an electro magnet or magnets included in the conductors and provided with translating devices or incandescing lamps, arranged in multiple arc with the branches of the exciting-circuit of said magnets and with the main conductors in which said magnets are included, all as more fully hereinafter described.

In the drawing which accompanies this specification, the invention is shown in diagram, in which A and B represent two bobbins of the revolving armature and P and N the field-magnets, of opposite polarity, of a generator of any known construction and organized for the production of electrical currents of high potential alternating in direction.

C represents a commutator provided with segmental contacts D E, which constitute the poles of the armatures, and with two sets of brushes, F F' and G G', on opposite sides of the commutator, all so arranged that as the armature revolves the electrical impulses of like polarity generated in the armature are received on one set of brushes, while the electrical impulses of opposite polarity are received on the other set of brushes without breaking the current. If there are more poles, the contacts and brushes are correspondingly increased in number to effect the same result of collecting all the currents of like polarity without creating any break.

Commutator-segments D E cover one-half a circle, and are both on the same side, and are electrically connected to the opposite terminals of the generating bobbin or bobbins of the armature. As the two sets of brushes F F' and G G' are set one hundred and eighty degrees apart, or at opposite terminals of a diametrical line through the commutator, it follows that the segments D E will just make contact with brushes F F' when they leave contact with brushes G G', and by reason of the change of the armature with reference to the field-poles P and N the polarity of the segment D will be reversed when it reaches the brush F; so also that of E will be reversed when it reaches F'. Brushes F and G' will therefore always receive impulses of like polarity, and brushes G and F' impulses of like polarity. One set of these brushes, as F G', is electrically connected by a conductor, I, as shown, and to a line-wire, K, and the other brushes, F' G, are connected, respectively, to independent return wires, in which are interposed reaction-coils, as will be presently explained.

K J and I K L H are two sets of main conductors, and P' P'' are electro-magnets or reaction-coils included in these main conductors, all so arranged that one set of conductors, I K J, forms an electrical circuit for the electrical pulsations in one direction, and the other set of conductors, K J, forms an electrical circuit for the electrical pulsations in the other directions, the current in the circuits being always in the same direction, and pulsating or intermittent in its character.

The electro-magnets may be either arranged in distinct sections or represent merely fractions of one coil, both arrangements being shown in the drawing, and these sections are provided with the branch conductors M M, with which and the main conductors the lamps or translating devices are placed in multiple arc. It will be seen that by this arrangement a division and conversion of the current is obtained, consisting in first separating the positive and negative pulsations of an alternating-current machine into two pulsating currents of equal and constant duration by conducting them into separate conductors, forming two independent circuits, whereby the loss of electro-motive force, occasioned by dividing a straight current into pulsating currents, is avoided, and, second, by converting the intermittent pulsating currents thus obtained into currents of lower potential by means of electro-magnets and the branch circuits, which latter effect the discharge of the magnets through the translating devices. Thus if, for instance, a three-hundred-volt current flows through the circuit K J, the current through the lamps will be equal to a one-hundred-volt current.

It will be understood from what has been described and from an inspection of the drawings that the magnets P' and P'', representing two plants, are successively in circuit with the armature-coils, and as the translating devices are in shunt relation to the magnets or sections of the magnets, it will be evident that these translating devices will be supplied with current from the dynamo-machine so long as commutator-segments are under the brushes corresponding to the plant. In other words, in the exemplification of the invention shown in the drawing the translating devices at P' will be supplied with direct current only during a half-revolution of the armature; but during the other half-revolution of the armature an induced wave of electricity, due to the discharge of magnet P', will flow through the translating devices at that plant, this being the only path of discharge for the induced current of the magnet at that moment. The electro-motive force of this induced current will vary according to the number of turns in the section of the magnet-coil with which the translating devices are connected in circuit. As shown at P', the outer sections of the magnet are discharged through the separate translating devices, while all of the sections discharge in series through other translating devices. The connections of these sections may be varied in a manner well understood to make the electro-motive force of the discharge-wave of the desired tension. It will also be seen that with the connection shown the discharge-wave through the translating devices due to the demagnetization of P' or P'' will be in the same direction through those devices as the current from the dynamo-machine, and that said discharge will re-enforce main supply-current. If the translating devices are lamps, this action will maintain the filaments at a higher uniform degree of incandescence by furnishing a supply of current during the periods occupied by reversal or interruption in systems heretofore in use.

It is obvious that a motor or motors, S, may be run by placing the same in multiple circuit between the conductors K and J, as shown. While there are no means shown for changing the potential of the current the mechanical work obtained by this system of distributing electrical energy in the form of pulsations is equivalent to that obtained from a constant current of lower potential as a factor of time forms a means of converting.

What I claim as my invention is—

1. In a system of electrical distribution, the combination of an alternating-current machine provided with two sets of brushes, a line-wire electrically connected with one set of brushes of like sign, and independent return branches from said line-wire electrically connected, respectively, with the two brushes of the other sign, whereby electrical waves of one polarity may be maintained throughout the line-circuit and its branches.

2. In a system of electrical distribution, the combination of an alternating-current generator, contact-surfaces connected with the terminals of its generating-coils, two pairs of distributing-brushes alternately engaging said contact-surfaces at points of alternation, a line-wire electrically connected to two brushes of like sign, and independent return branches of said line-wire connected, respectively, to the brushes of opposite sign, whereby intermittent impulses of one direction will circulate in the respective circuits.

3. In a system of electrical distribution, the combination of an alternating-current generator, contact-surfaces connected with the terminals of its generating-coils, two pairs of distributing-brushes alternately engaging said contact-surfaces at points of alternation, a line-wire electrically connected to a pair of brushes of like sign, independent return branches of said line-wire connected, respectively, to the brushes of opposite sign, an induction-generator in each branch, and translating devices supplied by said generator.

In testimony whereof I affix my signature, in presence of two witnesses, this 19th day of April, 1888.

THOS. H. HICKS.

Witnesses:
P. M. HULBERT,
JAS. WHITTEMORE.